United States Patent
O'Farrell (10) Patent No.: US 7,277,495 B2
(45) Date of Patent: Oct. 2, 2007

(54) DATA COMMUNICATION

(75) Inventor: Timothy O'Farrell, Leeds (GB)

(73) Assignee: Supergold Communication Limited, Limassol (CY)

( * ) Notice: Subject to any disclaimer, the term of this patent is extended or adjusted under 35 U.S.C. 154(b) by 661 days.

(21) Appl. No.: 10/182,077

(22) PCT Filed: Jan. 25, 2001

(86) PCT No.: PCT/EP01/01016

§ 371 (c)(1),
(2), (4) Date: Jan. 29, 2003

(87) PCT Pub. No.: WO01/56173

PCT Pub. Date: Aug. 2, 2001

(65) Prior Publication Data

US 2003/0165182 A1 Sep. 4, 2003

(30) Foreign Application Priority Data

Jan. 25, 2000 (IE) .............................. S2000/0063

(51) Int. Cl.
*H04L 5/12* (2006.01)
(52) U.S. Cl. ..................................... 375/264
(58) Field of Classification Search ............. 375/134, 375/137, 145, 149, 333, 361, 286, 288, 289, 375/293, 294, 130, 261, 264, 298, 430, 343; 341/9, 70, 72, 74, 82, 173; 708/3, 5, 7, 422, 708/424, 426, 625
See application file for complete search history.

(56) References Cited

U.S. PATENT DOCUMENTS 5,602,833 A * 2/1997 Zehavi ...................... 370/209
5,724,383 A * 3/1998 Gold et al. ................. 375/141
6,738,411 B1 * 5/2004 Ogawa et al. .............. 375/130

OTHER PUBLICATIONS

Suehiro, N., et al., "Binary Signal Design for Approximately Synchronized CDMA Systems without Detection Sidelobe nor Co-Channel Interference Using Auto- and Cross-Complementary Codes," IEEE 1998 International Conference on Universal Personal Communications, ICUPC '98, Florence, Italy, pp. 1097-1102, vol. 2, XP-002173807 1998, New York, NY, USA, IEEE.
Suehiro, N., "New Signal Design Method by Coded Addition of Sequences," Proceedings of the 1995 IEEE International Symposium on Information Theory, Whistler, BC, Can, Sep. 17-22, 1995, p. 91, XP-002173808 1995, Piscataway, NJ, USA, IEEE.

(Continued)

*Primary Examiner*—Khanh Tran
*Assistant Examiner*—Sam Ahn
(74) *Attorney, Agent, or Firm*—Lipsitz & McAllister, LLC (57) ABSTRACT

A method and apparatus for data communication in a variety of communication systems using spread spectrum techniques and multilevel sequences in which distinct multilevel sequences used contain binary subsequences that interfere constructively such that synchronous cross-correlation values add constructively. By adding two subsequences from different sets, it is ensured that neither subsequence belongs to the same set. This, in combination with use of correlators, reduces complexity and facilitates increasing the order of a modulation scheme, thus enhancing the bandwidth efficiency.

25 Claims, 2 Drawing Sheets

Multilevel Code Keying Modulation Scheme

OTHER PUBLICATIONS

Das, J., "A Technique for Improving the Efficiency of $M$-ary Signaling," IEEE Transactions on Communications, US, IEEE Inc., New York, US, vol. COM-32, No. 2, Feb. 1, 1984, pp. 199-201, XP-002072640, ISSN: 0090-6778.

Enge, P. K., et al., "Spread-Spectrum Multiple-Access Performance of Orthogonal Codes: Linear Receivers," IEEE Transactions on Communications, IEEE Inc., New York, US, vol. COM-35, No. 12, Dec. 1, 1987, pp. 1309-1319, XP-000560639, ISSN: 0090-6778.

* cited by examiner

Figure 1: Multilevel Code Keying Modulation Scheme

DATA COMMUNICATION

This application claims the benefit of international application number PCT/EP01/01016 filed Jan. 25, 2001, which claims priority of Irish patent application S2000/0063 filed Jan. 25, 2000. The international application was published under PCT Article 21(2) in the English language.

The present invention relates to data communication and more particularly, to data communication using spread spectrum techniques. The invention also relates to communication applications using multilevel sequences. For the purposes of this specification, a multilevel sequence is constructed by the superposition of a number of sequences.

Techniques of this type are used for information carrying signals in a variety of communication systems because of their ability to increase data throughput and to reduce the effects of certain transmission impairments including, but not limited to co-channel interference, multiple access interference and intersymbol interference. Local Area Networks (LANs) is one area in which there is an increasing need for wireless access. This allows mobile computer users to remain in contact with a given corporate LAN over short distances. Data transmission rates achievable with known solutions are relatively low limiting the range of potential applications.

The Institute for Electrical and Electronic Engineers (IEEE) has now formalized the 802.11 standard to help improve and promote the growth of Wireless LAN (WLAN) products however, the difficulties of transmission rates, reliability and cost remain. Spread spectrum communication techniques using multilevel sequences represents one possible solution however, it is difficult to synchronise data communication without the use of complex circuitry. Synchronisation difficulties include symbol synchronisation, chip synchronisation and signal strength measurements (SSM) as well as the problem of synchronisation maintenance.

There is therefore a need for a method and apparatus, which will overcome the aforementioned problems.

Accordingly, the invention provides a method and apparatus for data communication using spread spectrum techniques and multilevel sequences.

Preferably, the method utilises symbols, said symbols having a multilevel sequence constructed by adding together at least two subsequences taken from different sets thereby ensuring that neither subsequence belongs to the same set.

In one arrangement, the or each subsequence is a binary sequence.

Ideally, distinct multilevel sequences are selected for use which interfere constructively.

In one arrangement of the invention, detection of a symbol for demodulation is achieved using an M-ary receiver provided by a bank of M correlators wherein each M correlator is matched to a multilevel sequence.

Preferably, a greatest peak detector of size M is formed to detect the symbol transmitted. Thus, by exploiting the composite nature of the multilevel sequences, a substantial reduction in receiver complexity is achieved.

In a particularly preferred embodiment, a mulitlevel symbol is detected using a plurality of banks of correlators, each correlator being of a predefined length.

Ideally, each correlator output is subjected to linear addition and analysed to determine whether it corresponds to a valid subsequence. Thus, with every other correlator output that corresponds to a valid subsequence that is for each valid symbol the same M test statistics as those obtained when a bank of M correlators is used providing a significant reduction in the number of correlators. In addition to reducing complexity, the new scheme is readily amenable to increasing the order of the modulation scheme and thereby enhancing the bandwidth efficiency.

In a preferred arrangement, an amplitude modulation factor is used in accordance with, for example when just two sequences are added together, $$\{\tilde{a}_i\} = \alpha\{b_i\} + \beta\{c_i\}$$

Ideally, the amplitude demodulation process incorporates means for discriminating between different symbols having similar greatest peak positions.

In another arrangement, the method is formed for detecting a symbol using m-banks of n-correlators wherein the length of each correlator is w.

Preferably, the method incorporates means for isolating a correlator output having the greatest peak from the bank of n correlators corresponding to the set from which the subsequence was taken.

Ideally, the method is carried out for each subsequence in the multilevel sequence. Thus, the receiver obtains m greatest peaks corresponding to m distinct correlators (one from each bank) which uniquely identifies the multilevel sequence transmitted.

Preferably, a lookup table is used to decode the k data bits that correspond to the detected multilevel sequence. Thus modulation is achieved with minimal correlators and only requires m greatest peak detectors each of size n; thereby reducing substantially the complexity of the maximum likelihood detection process.

According to another aspect of the invention, multilevel sequences are constructed by adding together subsequences taken from complementary sets of binary sequences.

Ideally the method is formed for identification of sequences having the following properties:
cyclically distinct;
possess low autocorrelation sidelobes;
possess low intra-crosscorrelation magnitudes; and
posess low inter-crosscorrelation magnitudes.

According to another aspect of the invention there is provided a method for data communication using spread spectrum techniques and multilevel sequences characterised in that selection distinct multilevel sequences used in the method contain binary subsequences that interfere constructively such that synchronous cross-correlation values add constructivly.

Preferably, the method utilises symbols, said symbols having a multilevel sequence constructed by adding together at least two subsequences taken from different sets.

Preferably, a subsequence is provided as a binary sequence.

Preferably, the method includes the step of detecting of a symbol for demodulation using an M-ary receiver.

Preferably, the M-ary receiver incorporates a bank of M correlators in which:
each M correlator is matched to a multilevel sequence; and
forming a greatest peak detector of size M is to detect the symbol transmitted.

Preferably, a mulitlevel symbol is detected using a plurality of banks of predefined length correlators.

Preferably, each predefined length correlator output is subjected to linear addition and analysed to identify a valid subsequence.

Preferably, the method utilises an amplitude demodulation process.

Preferably, the amplitude demodulation process incorporates means for discriminating between different symbols having similar greatest peak positions.

Preferably, a symbol is detected using m-banks of n-correlators of predefined length.

Preferably, the method incorporates means for isolating a correlator output having a greatest peak from the bank of n correlators corresponding to the set from which the subsequence was taken.

Preferably, a lookup table is used to decode data bits corresponding to a detected multilevel sequence.

Preferably, the multilevel sequences are constructed by adding together subsequences taken from complementary sets of binary sequences.

Preferably, the step of identifying sequences having the properties of being cyclically distinct and possessing:
  low autocorrelation sidelobes;
  low intra-crosscorrelation magnitudes; and
  low inter-crosscorrelation magnitudes.

According to another aspect of the invention there is provided a data communications apparatus using spread spectrum techniques and multilevel sequences characterised in that the apparatus incorporates means for selection of distinct multilevel sequences containing constructively interfereing binary subsequences such that synchronous cross-correlation values add constructivly.

Ideally, the apparatus incorporates means for detecting of a symbol for demodulation using an M-ary receiver.

Ideally, the M-ary receiver incorporates a bank of M correlators in which:
  each M correlator is matched to a multilevel sequence; and
  forming a greatest peak detector of size M is to detect the symbol transmitted.

Ideally, a mulitlevel symbol is detected using a plurality of banks of predefined length correlators.

Ideally, each predefined length correlator output is subjected to linear addition and analysed to identify a valid subsequence.

Ideally, the apparatus includes an amplitude demodulator.

Ideally, the amplitude demodulator includes means for discriminating between different symbols having similar greatest peak positions.

Ideally, the means for detecting a symbolincludes m-banks of n-correlators of predefined length.

Ideally, the apparatus includes means for isolating a correlator output having a greatest peak from the bank of n correlators corresponding to the set from which the subsequence was taken.

Ideally, the apparatus includes a lookup table for decoding data bits corresponding to a detected multilevel sequence.

Ideally, the apparatus incorporates means for adding together subsequences taken from complementary sets of binary sequences to construct multilevel sequences.

The invention will now be described more particularly with reference to the accompanying drawings, which show, by way of example only, one embodiment of data communication method and apparatus according to the invention. In the drawings.

To aid understanding of the current invention, a brief discussion of multilevel sequences is given. Letting m denote the number of sets of binary sequences used where each set contains n distinct sequences each of length w. Then a multilevel sequence is constructed by adding together m binary subsequences each taken from a different set. That is, no two subsequences belong to the same set. By subsequence is meant a binary sequence used in the construction of a multilevel sequence. The total number of multilevel sequences which can be constructed is equal to $n^m$. In general, the $n^m$ multilevel sequences may be used as symbols in an M-ary digital communication system where typically $M=2^k=n^m$ and k is the number of data bits encoded by the M-ary modulation scheme. If the bandwidth efficiency of the M-ary scheme is defined by the ratio k/w, then bandwidth efficiencies of the order of unity can be achieved by this scheme while a good communication link performance is retained. Also, the transceiver complexity is only increased by a modest amount.

The following sequence notation has been adopted throughout
  A binary biphase sequence $\{a_i\}$ has elements $a_i \epsilon \{-1,1\}$. For simplicity in the description of sequence generation hereinafter, the binary biphase notation $a_i \epsilon \{-,+\}$ is used where symbol "−" denotes a "−1" and the symbol "+" denotes a "+1".
  We denote a binary biphase sequence of length w by $\{a_i\}=(a_0,a_1,a_2, \ldots a_{w-1})$ while $\{a^{(x)}\}$ denotes a binary biphase sequences $\{a_i^{(0)}\}, \{a_i^{(1)}\}, \{a_i^{(2)}\}, \ldots \{a_i^{(x-1)}\}$, each of length w.
  A multilevel sequence $\{ã_i\}$ has elements $ã_i \epsilon Z$ (i.e. the set of all integers) and we denote a multilevel sequence of length w by $\{ã_i\}=(ã_0, ã_1, ã_2, ã_{w-1})$ while $\{ã^{(x)}\}$ denotes a set of multilevel sequences $\{ã_i^{(0)}\}, \{ã_i^{(1)}\}, \{ã_i^{(2)}\}, \ldots \{ã_i^{(x-1)}\}$ each of length w.

A Multilevel Code Keying (MCK) modulation scheme in accordance with the invention is now described with reference to the use of multilevel sequences.

In the method of the invention, k binary data bits are used to encode $2^k$ symbols where a symbol is a multilevel sequence constructed according to the principle described above.

Figure 1:
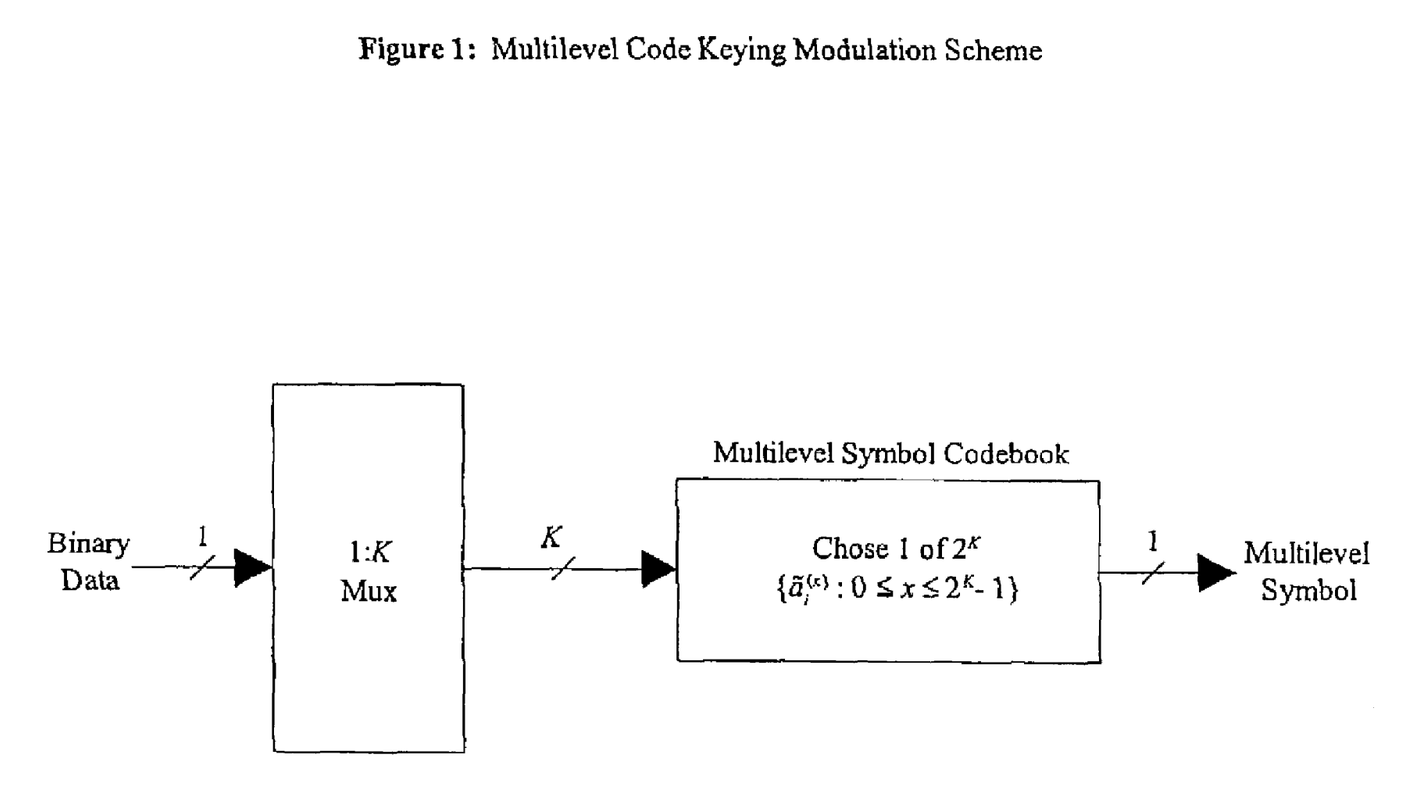
FIG. 1. shows a multilevel code keying scheme in accordance with the invention.

MCK is an M-ary scheme dimensioned such that $2^k \leq n^m$, that is, there can be more multilevel sequences than symbols. Thus $2^k$ multilevel sequences are selected from the total set of $n^m$ multilevel sequences according to a predefined selection process. The $2^k$ multilevel sequences thus selected are assigned to be symbols in the M-ary scheme. FIG. 1 shows a schematic diagram of an MCK modulation scheme.

Symbol selection can be based on a number of different methods. The underlying principle behind these methods being the selection of distinct multilevel sequences which contain binary subsequences that interfere constructively. That is, their synchronous cross-correlation values add in a constructive manner rather than a destructive one. A method for choosing multilevel sequences with good properties is an important feature of the current invention and is described below.

Figure 2:
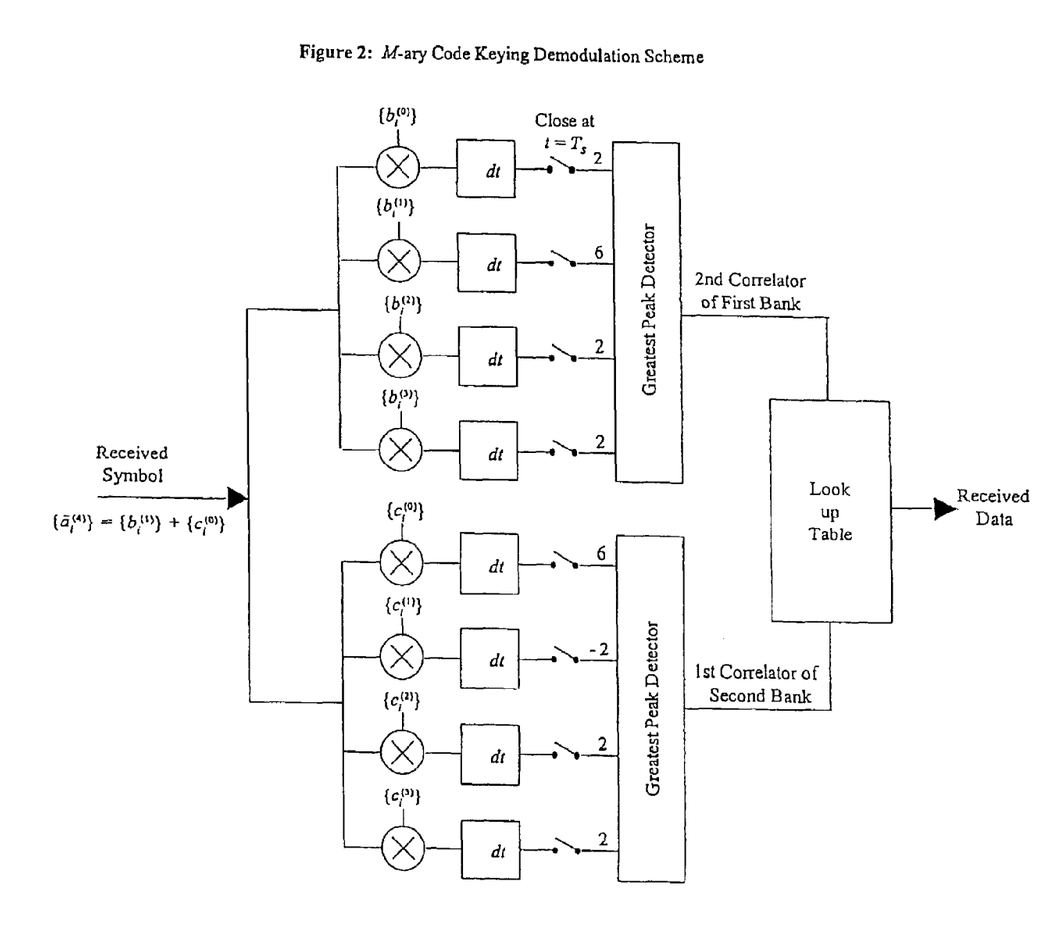
FIG. 2. shows an M-ary Code keying Demodulation scheme.

Referring now to FIG. 2 there is shown a demodulation scheme in accordance with the invention. At the receiver the detection of a symbol can be done in one of two ways. One way is to use a conventional M-ary receiver which consists of a bank of M correlators, each matched to a multilevel sequence, and a greatest peak detector of size M that detects the symbol transmitted. By exploiting the composite nature of the multilevel sequences, a substantial reduction in receiver complexity can be realised in this scheme. A mulitlevel symbol can be detected by using m-banks of n-correlators where the length of each correlator is w. The linear addition of each correlator output that corresponds to a valid subsequence with every other correlator output that corresponds to a valid subsequence (i.e. for each valid symbol) gives the same M test statistics as those obtained when a bank of M correlators is used. The M test statistics are fed to a greatest peak detector of size M as usual. This new scheme requires just mn correlators instead of the M correlators used in a conventional M-ary scheme.

In addition to reducing complexity, the new scheme is readily amenable to increasing the order of the modulation scheme and thereby enhancing the bandwidth efficiency. This is done by introducing an amplitude modulation factor when subsequences are combined as illustrated by $$\{\tilde{a}_i\} = \alpha\{b_i\} + \beta\{c_i\}$$

The coefficients $\{\alpha, \beta\}$ may be positive integers and the number of available symbols depends on the range of values of $\{\alpha, \beta\}$. For example, when $\alpha, \beta \in \{1,2\}$, m=2 and n=w=4 then the total number of available multilevel sequences in 64 instead of 16 when amplitude modulation is not used. When amplitude modulation is used then the same symbol detection schemes described earlier can be used. However, an extra signal processing step is required at the correlator outputs in order to discriminate between different symbols that have the same greatest peak position but different greatest peak magnitudes due to the amplitude modulation effect.

In the second scheme, a symbol is detected by using m-banks of n-correlators where the length of each correlator is w. Since a multilevel sequence consists of m subsequences, one taken from each of the m sets, then a subsequence is detected, in a maximum likelihood sense, by choosing the correlator output with the greatest peak from the bank of n correlators corresponding to the set from which the subsequence was taken. This procedure is carried out for each subsequence in the multilevel sequence. Consequently, the receiver obtains m greatest peaks corresponding to m distinct correlators (one from each bank) which uniquely identifies the multilevel sequence transmitted. Finally, a lookup table is used to decode the k data bits that correspond to the detected multilevel sequence.

The second scheme offers a number of advantages over the first scheme, thereby making it the preferred choice in most partical applications. Like the first scheme, the second only requires mn correlators. Unlike the first scheme, which requires a single greatest peak detector of size M, the second only requires m greatest peak detectors each of size n; thereby reducing substantially the complexity of the maximum likelihood detection process. In addition, the BER versus $E_b/N_o$ performance of the second scheme is similar to that of the first scheme since for both schemes the distances between the greatest peak and its nearest neighbours are similar. That is, both detection methods give almost the same performances.

The Multilevel Code Keying scheme described above is illustrated by way of example when m=2 and n=w=4. Two subsequence sets $\{b^{(4)}\}$ and $\{c^{(4)}\}$ are selected as illustrated in Table 1.

TABLE 1

MCK Subsequence Sets

| $\{b^{(4)}\}$ | | $\{c^{(4)}\}$ | |
|---|---|---|---|
| $\{b_i^{(0)}\}$ | + + + − | $\{c_i^{(0)}\}$ | + + + + |
| $\{b_i^{(1)}\}$ | + + − + | $\{c_i^{(1)}\}$ | + − + − |
| $\{b_i^{(2)}\}$ | + − + + | $\{c_i^{(2)}\}$ | + + − − |
| $\{b_i^{(3)}\}$ | − + + + | $\{c_i^{(3)}\}$ | + − − + |

Then a set of multilevel sequences is constructed by the addition of every sequence in $\{b^{(4)}\}$ with every sequence in $\{c^{(4)}\}$ as illustrated in Table 2. For the example given, there are $4^2(=16)$ multilevel sequences each of length w=4.

In this example, the multilevel sequences $\{\tilde{a}_i^{(3)}\}$, $\{\tilde{a}_i^{(5)}\}$ and $\{\tilde{a}_i^{(10)}\}$ are not distinct, and therefore symbols must be selected from a set of 14 rather than 16 multilevel sequences. A subset of eight symbols is selected by choosing eight multilevel sequences with greatest peak values at the correlator outputs. That is, the symbol set chosen is $\{\{\tilde{a}_i^{(0)}\}, \{\tilde{a}_i^{(1)}\}, \{\tilde{a}_i^{(2)}\}, \{\tilde{a}_i^{(4)}\}, \{\tilde{a}_i^{(6)}\}, \{\tilde{a}_i^{(7)}\}, \{\tilde{a}_i^{(8)}\}, \{\tilde{a}_i^{(9)}\}\}$ and the corresponding greatest peak values at the correlator outputs are $\{6,6\}$ in all cases. In addition to the set given, multilevel sequences $\{\tilde{a}_i^{(11)}\}$ and $\{\tilde{a}_i^{(12)}\}$ could have been chosen according to the greatest peak criterion. In general, each multilevel sequence is not necessarily distinct, though the number of distinct multilevel sequences is increased when each subsequence is cyclically distinct. Furthermore, each multilevel sequence is not necessarily cyclically distinct, though the number of cyclically distinct multilevel sequences is increased when long, cyclically distinct subsequences are used.

TABLE 2

MCK Multilevel Sequences $\{\tilde{a}^{(16)}\}$

| | | | | | |
|---|---|---|---|---|---|
| $\{\tilde{a}_i^{(0)}\}$ | $\{(b_i^{(0)}) + (c_i^{(0)})\}$ | 2 | 2 | 2 | 0 |
| $\{\tilde{a}_i^{(1)}\}$ | $\{(b_i^{(0)}) + (c_i^{(1)})\}$ | 2 | 0 | 2 | −2 |
| $\{\tilde{a}_i^{(2)}\}$ | $\{(b_i^{(0)}) + (c_i^{(2)})\}$ | 2 | 2 | 0 | −2 |
| $\{\tilde{a}_i^{(3)}\}$ | $\{(b_i^{(0)}) + (c_i^{(3)})\}$ | 2 | 0 | 0 | 0 |
| $\{\tilde{a}_i^{(4)}\}$ | $\{(b_i^{(1)}) + (c_i^{(0)})\}$ | 2 | 2 | 0 | 2 |
| $\{\tilde{a}_i^{(5)}\}$ | $\{(b_i^{(1)}) + (c_i^{(1)})\}$ | 2 | 0 | 0 | 0 |
| $\{\tilde{a}_i^{(6)}\}$ | $\{(b_i^{(1)}) + (c_i^{(2)})\}$ | 2 | 2 | −2 | 0 |
| $\{\tilde{a}_i^{(7)}\}$ | $\{(b_i^{(1)}) + (c_i^{(3)})\}$ | 2 | 0 | −2 | 2 |
| $\{\tilde{a}_i^{(8)}\}$ | $\{(b_i^{(2)}) + (c_i^{(0)})\}$ | 2 | 0 | 2 | 2 |
| $\{\tilde{a}_i^{(9)}\}$ | $\{(b_i^{(2)}) + (c_i^{(1)})\}$ | 2 | −2 | 2 | 0 |
| $\{\tilde{a}_i^{(10)}\}$ | $\{(b_i^{(2)}) + (c_i^{(2)})\}$ | 2 | 0 | 0 | 0 |
| $\{\tilde{a}_i^{(11)}\}$ | $\{(b_i^{(2)}) + (c_i^{(3)})\}$ | 2 | −2 | 0 | 2 |
| $\{\tilde{a}_i^{(12)}\}$ | $\{(b_i^{(3)}) + (c_i^{(0)})\}$ | 0 | 2 | 2 | 2 |
| $\{\tilde{a}_i^{(13)}\}$ | $\{(b_i^{(3)}) + (c_i^{(1)})\}$ | 0 | 0 | 2 | 0 |
| $\{\tilde{a}_i^{(14)}\}$ | $\{(b_i^{(3)}) + (c_i^{(2)})\}$ | 0 | 2 | 0 | 0 |
| $\{\tilde{a}_i^{(15)}\}$ | $\{(b_i^{(3)}) + (c_i^{(3)})\}$ | 0 | 0 | 0 | 2 |

FIG. 2 shows a schematic diagram of the MCK receiver which uses m=2 banks of correlators each containing n=4 correlators. One correlator bank is matched to the binary subsequence set $\{b^{(4)}\}$ while the other is matched to $\{c^{(4)}\}$. The correlator output values are shown for the transmitted multilevel symbol $\{\tilde{a}hd\ i^{(4)}\}=\{2, 2, 0, 2\}$. The MCK scheme presented in this example uses eight symbols (i.e. 8-ary MCK) and is capable of encoding k=3 data bits per symbol. Therefore, the bandwidth efficiency of the scheme is equal to 0.75 (i.e. k/w). Furthermore, a total of nm=8 correlators is required at the receiver.

In addition to MCK, it is possible to define Multilevel Bi-Code Keying (MBCK). In MBCK the multilevel sequences are constructed by adding together subsequences taken from complementary sets of binary sequences. By complementary set is meant a set of 2n binary sequences each of length w where one half of the set is the complement of the other half. An MBCK encoding scheme may be illustrated by way of example when m=2, n=4 and w=4. The two sets of binary subsequences used in the illustration of MCK are reused here but now include their complementary sequences as shown in Table 3.

TABLE 3

MBCK Subsequence Sets

| $\{b^{(8)}\}$ | | $\{c^{(8)}\}$ | |
|---|---|---|---|
| $\{b_i^{(0)}\}$ | + + + − | $\{c_i^{(0)}\}$ | + + + + |
| $\{b_i^{(1)}\}$ | + + − + | $\{c_i^{(1)}\}$ | + − + − |
| $\{b_i^{(2)}\}$ | + − + + | $\{c_i^{(2)}\}$ | + + − − |
| $\{b_i^{(3)}\}$ | − + + + | $\{c_i^{(3)}\}$ | + − − + |
| $\{b_i^{(4)}\}$ | − − − + | $\{c_i^{(4)}\}$ | − − − − |
| $\{b_i^{(5)}\}$ | − − + − | $\{c_i^{(5)}\}$ | − + − + |
| $\{b_i^{(6)}\}$ | − + − − | $\{c_i^{(6)}\}$ | − − + + |
| $\{b_i^{(7)}\}$ | + − − − | $\{c_i^{(7)}\}$ | − + + − |

TABLE 4

MBCK Multilevel Sequences $\{\tilde{a}^{(64)}\}$

| | | | | |
|---|---|---|---|---|
| $\{\tilde{a}_i^{(0)}\}$ | 2 | 2 | 2 | 0 |
| $\{\tilde{a}_i^{(1)}\}$ | 2 | 0 | 2 | −2 |
| $\{\tilde{a}_i^{(2)}\}$ | 2 | 2 | 0 | −2 |
| $\{\tilde{a}_i^{(3)}\}$ | 2 | 0 | 0 | 0 |
| $\{\tilde{a}_i^{(4)}\}$ | 0 | 0 | 0 | −2 |
| $\{\tilde{a}_i^{(5)}\}$ | 0 | 2 | 0 | 0 |
| $\{\tilde{a}_i^{(6)}\}$ | 0 | 0 | 2 | 0 |
| $\{\tilde{a}_i^{(7)}\}$ | 0 | 2 | 2 | −2 |
| $\{\tilde{a}_i^{(8)}\}$ | 2 | 2 | 0 | 2 |
| $\{\tilde{a}_i^{(9)}\}$ | 2 | 0 | 0 | 0 |
| $\{\tilde{a}_i^{(10)}\}$ | 2 | 2 | −2 | 0 |
| $\{\tilde{a}_i^{(11)}\}$ | 2 | 0 | −2 | 2 |
| $\{\tilde{a}_i^{(12)}\}$ | 0 | 0 | −2 | 0 |
| $\{\tilde{a}_i^{(13)}\}$ | 0 | 2 | −2 | 2 |
| $\{\tilde{a}_i^{(14)}\}$ | 0 | 0 | 0 | 2 |
| $\{\tilde{a}_i^{(15)}\}$ | 0 | 2 | 0 | 0 |
| $\{\tilde{a}_i^{(16)}\}$ | 2 | 0 | 2 | 2 |
| $\{\tilde{a}_i^{(17)}\}$ | 2 | −2 | 2 | 0 |
| $\{\tilde{a}_i^{(18)}\}$ | 2 | 0 | 0 | 0 |
| $\{\tilde{a}_i^{(19)}\}$ | 2 | −2 | 0 | 2 |
| $\{\tilde{a}_i^{(20)}\}$ | 0 | −2 | 0 | 0 |
| $\{\tilde{a}_i^{(21)}\}$ | 0 | 0 | 0 | 2 |
| $\{\tilde{a}_i^{(22)}\}$ | 0 | −2 | 2 | 2 |
| $\{\tilde{a}_i^{(23)}\}$ | 0 | 0 | 2 | 0 |
| $\{\tilde{a}_i^{(24)}\}$ | 0 | 2 | 2 | 2 |
| $\{\tilde{a}_i^{(25)}\}$ | 0 | 0 | 2 | 0 |
| $\{\tilde{a}_i^{(26)}\}$ | 0 | 2 | 0 | 0 |
| $\{\tilde{a}_i^{(27)}\}$ | 0 | 0 | 0 | 2 |
| $\{\tilde{a}_i^{(28)}\}$ | −2 | 0 | 0 | 0 |
| $\{\tilde{a}_i^{(29)}\}$ | −2 | 2 | 0 | 2 |
| $\{\tilde{a}_i^{(30)}\}$ | −2 | 0 | 2 | 2 |
| $\{\tilde{a}_i^{(31)}\}$ | −2 | 2 | 2 | 0 |
| $\{\tilde{a}_i^{(32)}\}$ | 0 | 0 | 0 | 2 |
| $\{\tilde{a}_i^{(33)}\}$ | 0 | −2 | 0 | 0 |
| $\{\tilde{a}_i^{(34)}\}$ | 0 | 0 | −2 | 0 |
| $\{\tilde{a}_i^{(35)}\}$ | 0 | −2 | −2 | 2 |
| $\{\tilde{a}_i^{(36)}\}$ | −2 | −2 | −2 | 0 |
| $\{\tilde{a}_i^{(37)}\}$ | −2 | 0 | −2 | 2 |
| $\{\tilde{a}_i^{(38)}\}$ | −2 | −2 | 0 | 2 |
| $\{\tilde{a}_i^{(39)}\}$ | −2 | 0 | 0 | 0 |
| $\{\tilde{a}_i^{(40)}\}$ | 0 | 0 | 2 | 0 |
| $\{\tilde{a}_i^{(41)}\}$ | 0 | −2 | 2 | −2 |
| $\{\tilde{a}_i^{(42)}\}$ | 0 | 0 | 0 | −2 |
| $\{\tilde{a}_i^{(43)}\}$ | 0 | −2 | 0 | 0 |
| $\{\tilde{a}_i^{(44)}\}$ | −2 | −2 | 0 | −2 |
| $\{\tilde{a}_i^{(45)}\}$ | −2 | 0 | 0 | 0 |
| $\{\tilde{a}_i^{(46)}\}$ | −2 | −2 | 2 | 0 |
| $\{\tilde{a}_i^{(47)}\}$ | −2 | 0 | 2 | −2 |
| $\{\tilde{a}_i^{(48)}\}$ | 0 | 2 | 0 | 0 |
| $\{\tilde{a}_i^{(49)}\}$ | 0 | 0 | 0 | −2 |
| $\{\tilde{a}_i^{(50)}\}$ | 0 | 2 | −2 | −2 |
| $\{\tilde{a}_i^{(51)}\}$ | 0 | 0 | −2 | 0 |
| $\{\tilde{a}_i^{(52)}\}$ | −2 | 0 | −2 | −2 |
| $\{\tilde{a}_i^{(53)}\}$ | −2 | 2 | −2 | 0 |
| $\{\tilde{a}_i^{(54)}\}$ | −2 | 0 | 0 | 0 |
| $\{\tilde{a}_i^{(55)}\}$ | −2 | 2 | 0 | −2 |
| $\{\tilde{a}_i^{(56)}\}$ | 2 | 0 | 0 | 0 |
| $\{\tilde{a}_i^{(57)}\}$ | 2 | −2 | 0 | −2 |
| $\{\tilde{a}_i^{(58)}\}$ | 2 | 0 | −2 | −2 |
| $\{\tilde{a}_i^{(59)}\}$ | 2 | −2 | −2 | 0 |
| $\{\tilde{a}_i^{(60)}\}$ | 0 | −2 | −2 | −2 |
| $\{\tilde{a}_i^{(61)}\}$ | 0 | 0 | −2 | 0 |
| $\{\tilde{a}_i^{(62)}\}$ | 0 | −2 | 0 | 0 |
| $\{\tilde{a}_i^{(63)}\}$ | 0 | 0 | 0 | −2 |

A set of multilevel sequences is constructed by the addition of every sequence in $\{b^{(8)}\}$ with every sequence in $\{c^{(8)}\}$ as illustrated in Table 4.

For the MBCK example, there are $(2n)^m = 8^2 (=64)$ multilevel sequences each of length w=4. By applying the greatest peak criterion it is possible to select 32 multilevel sequences to be used as symbols in a 32-ary modulation scheme. The 32 multilevel sequences selected are shown in Table 4 as the shaded cells and the corresponding magnitudes of the greatest peak values at the correlator outputs are $\{6,6\}$ for each symbol. A 32-ary modulation scheme is capable of encoding 5 bits per symbol. Hence, the bandwidth efficiency of this scheme is k/w=1.25.

MBCK uses the same demodulation scheme as MCK; that is, for the definition of n given MBCK requires just mn correlators. However, in MCK, either of the two maximum likelihood detection schemes discussed earlier can be used.

In the first scheme, each correlator output that corresponds to a valid subsequence is added to every other correlator output that also corresponds to a valid subsequence and hence a valid symbol. The addition is weighted according to the a priori known polarity of each subsequence; i.e. a weight of +1 for a positive subsequence and a weight of −1 for a negative (or complemented) subsequence. In this way a total of M test statistics are generated and fed to a gretest peak detector of size M. Since MBCK is a bi-code scheme like bi-orthogonal keying, then it is sufficient to generate just M/2 test statistics corresponding to one half of the symbol codebook; i.e. the addition of correlator outputs need only be done up to M/2 unique symbols. In this case the absolute values of the test statistics are fed to a gretest peak detector of size M/2. Then a symbol is uniquely detected by observing the greatest peak magnitude and its polarity before its absolute value was taken.

In the second scheme, the m sets of n test statistics are obtained using just mn correlators as in MCK. However, since MBCK is a bi-coding scheme which uses complementary sets of subsequences then the greatest peak magnitude is sought at the output of each bank of correlators and subsequently the polarity of each peak is used to identify whether or not the subsequence or its complement was detected. Then sufficient information is available to enable the look-up table to effect a correct decoding of the unique symbol transmitted. Once again, the second detection scheme is the preferred choice because it offers further substantial reductions in complexity without compromising the system BER performance.

The MBCK scheme presented in this example requires just eight correlators to detect the complementary symbols given in Table 4, as opposed to sixteen correlators when conventional 32-ary bi-code keying is used. This reduction in receiver complexity due to MBCK signaling is even more pronounced when n and m are large. Furthermore, though the sets of subsequences used in the examples are orthogonal this is not a requirement of either the MCK or MBCK shcemes. Non-orthogonal subsequence sets may be used which can give better system performance than orthogonal sets. In MCK and MBCK, since a multilevel sequence is constructed by the superposition of binary subsequences then distinct binary transmitters can be used to add subsequences directly on the channel thereby reducing the impairing effects of non-litearity at the transmitter.

In summary, it is worth noting that in conventional M-ary code keying a symbol is detected by a single bank of $M=2^k$ correlators and a greatest peak detector of size M. Furthermore, in conventional M-ary code keying the sequences are typically orthogonal. In the new MBCK scheme proposed there are three distinct differences: (1) $M=2^k \leq (2n)^m$ means that the full set of multilevel sequences is not always used to transmit data thereby leaving redundant symbols that can be used to detect errors; (2) the total number of correlators required at the receiver is mn instead of M while just m greatest peak detectors of size n are required and (3) the subsequences need not be orthogonal. This results in a low complexity modulation scheme with good BER performance and good bandwidth efficiency. Though any set of binary subsequences may be used in MCK and MBCK Structured Codes prove to be particularly beneficial in this application. For both MCK and MBCK the main desirable properties of subsequence sets are that each subsequence should be:
 cyclically distinct;
 possess low autocorrelation sidelobes;
 possess low intra-crosscorrelation magnitudes and
 possess low inter-crosscorrelation magnitudes.

By intra-crosscorrelation is meant the crosscorrelation of subsequences belonging to the same set. By inter-crosscorrelation is meant the crosscorrelation of subsequences belonging to different sets. Subsequence sets that possess these properties benefit MCK and MBCK by producing large numbers of cyclically distinct symbols which in turn encode more bits per symbol thereby maximising the system bandwidth efficiency k/w. Structured codes are ideally suited to MCK and MBCK because they possess all of the above properties. For example, it is possible to construct four closely related sets of length 16 Structured Codes from the seed set {++--, +-+-, -++-, ----}. For each set the intra-crosscorrelation magnitudes are zero (i.e. each set is orthogonal) while the inter-crosscorrelation magnitudes are given by $\sqrt{16}(=4)$ in all cases. In addition, the autocorrelation sidelobe magnitudes are upper bounded by $\sqrt{16}(=4)$ for every sequence of each set except the preset set. In a second example, it is possible to construct three closely related sets of length 12 Structured Codes from the seed set {++--, +-+-, -++-}. In this case, the intra-crosscorrelation magnitudes for each set are upper bound by 4 (i.e. each set is non-orthogonal) while the inter-crosscorrelation magnitudes are also upper bounded by 4. In addition, the autocorrelation sidelobe magnitudes are upper bounded by 4 for every sequence of each set except the preset set. Furthermore, the sequences in all three sets are balanced which makes them ideally suited to the cancellation of narrowband common mode interference. To provide a full disclosure three illustrative examples of MBCK are presented. In the first, second and third examples, Structured Codes of lengths w=9, 12 and 16 are used, respectively.

EXAMPLE 1 w=9

Structured Codes of length w=9 can be constructed from the seed set $\{a^{(3)}\}$={++-, +-+, -++}. Three sets of Structured Codes can be constructed corresponding to the a preset set and the addition tables {0 1 2, 1 2 0, 2 0 1} and {0 2 1, 2 1 0, 1 0 2}. Table 11 illustrates the three non-orthogonal sets of Structured Codes constructed.

TABLE 11

Structured Codes w = 9

| Preset Set | Addition Table 1 | Addition Table 2 |
|---|---|---|
| + + − + + − − − + | + + − + − + + − − | + + − + − − + − + |
| + − + + − + − + − | + − + − + − + + − | + − − + − + + + − |
| − + + − + + + − − | + − − + + − + − + | + − + + + − + − − |
| + + − − − + + + − | + + − − + − − − + | + + − − + + − + − |
| + − + − + − + − + | − + − − + + + + − | − + + − + − + + − |
| − + + + − − − + + | − + + + + − − + − | − + − + + − − + + |
| − − + + + − + + − | − − + + − + − + + | − − + + − + − − + |
| − + − + − + + − + | + − + − + + − − + | − + + + − + − − + |
| + − − − + + − + + | − + + − − + + − + | + − + − − + − + + |

The sets of Structured Codes presented in Table 11 can be used in an MBCK scheme as described in Section 3 with m=3, n=9 and w=9. In this case there are a total of $(2n)^m=18^3(=5832)$ multilevel sequences each of length w=9. It is possible to select $128(=2^7)$ unique multilevel sequences which can be used as symbols in an 128-ary modulation scheme. Since an 128-ary modulation scheme is capable of encoding k=7 bits per symbol then the bandwidth efficiency of this scheme is k/w=0.78. The MBCK scheme presented in this example requires just mn=27 correlators (i.e. 3 banks of 9 correlators) instead of the M/2=64 correlators required in a conventional 512-ary bi-code keying scheme.

EXAMPLE 2 w=12

TABLE 12

Structured Codes w = 12

| Preset Set | Addition Table 1 | Addition Table 2 |
|---|---|---|
| + + − − + + − − − − + + | + + − − + − + − + − − + | + + − − + − − + + − + − |
| + − + − + − + − − + − + | + − + − + − − − + + + − − | + − − + + + − + + − − |
| − + + − − + + − + − − + | + − − + + + − + − + − | + − + + + − − + − − − + |
| + + − − − − + + + + − − | + + − − + − + − + + − − | + + − − − + − + − + − + |
| + − + − − − + + + − + − | − + − + − + + + − + − − | − + + − − − + + + − − |
| − + + − + − − − + + + − | − + + − + + − − − − + | − + − + + + − − − + + − |
| − − + + + + − − + + − − | − − + + + − + − − + + − | − − + + − + + − + − + − |
| − + − + + + − + − − + + | + + − + − − + − + − + + | − + + + − + − − − − − + |
| + − − + − + + − − + + − | − + + − − − + + + + − | + − + − − − + + − + + |
| − − + + − − + + − − + + | − − + + − + − + + − − + | − − + + + − − + − + − + |
| − + − + − + − + − + − + | − + − + + − − + − − + + | + − − + − + − + − − + + |
| + − − + + − − + + − − + | + − + − − − + + + − + | − + − + − − + + + + − + |

Structured Codes of length w=12 can be constructed from the seed set $\{a^{(3)}\}=\{++--, +-+-, -++-\}$. Three sets of Structured Codes can be constructed corresponding to the preset set and the addition tables $\{0\ 1\ 2, 1\ 2\ 0, 2\ 0\ 1\}$ and $\{0\ 2\ 1, 2\ 1\ 0, 1\ 0\ 2\}$. Table 12 illustrates the three non-orthogonal sets of Structured Codes constructed.

The sets of Structured Codes presented in Table 12 can be used in an MBCK scheme as described in Section 3 with m=3, n=12 and w=12. In this case there are a total of $(2n)^m = 24^3 (=13,824)$ multilevel sequences each of length w=12. It is possible to select $2048 (=2^{11})$ unique multilevel sequences which can be used as symbols in an 2048-ary modulation scheme. Since an 2048-ary modulation scheme is capable of encoding k=11 bits per symbol then the bandwidth efficiency of this scheme is k/w=0.9167. The MBCK scheme presented in this example requires just mn=36 correlators (i.e. 3 banks of 12 correlators) instead of the M/2=1024 correlators required in a conventional 2048-ary bi-code keying scheme.

EXAMPLE 3 w=16

Structured Codes of length w=16 can be constructed from the seed set $\{a^{(3)}\}=\{++--, +-3+-, -++-, ----\}$. Four sets of Structured Codes can be constructed corresponding to the preset set and the addition tables $\{0\ 1\ 2\ 3, 1\ 0\ 3\ 2, 2\ 3\ 0\ 1, 3\ 2\ 1\ 0\}$, $\{0\ 2\ 3\ 1, 2\ 0\ 1\ 3, 3\ 1\ 0\ 2, 1\ 3\ 2\ 0\}$ and $\{0\ 3\ 1\ 2, 3\ 0\ 2\ 1, 1\ 2\ 0\ 3, 2\ 1\ 3\ 0\}$. Table 13 illustrates the four orthogonal sets of Structured Codes constructed.

It will be appreciated that though the specific embodiment described in this document relates to the use of (real) binary subsequences it should be realised that non-binary (real or complex) subsequences may be used without any loss of generality. That is, a multilevel sequence can be constructed by the superposition of multilevel subsequences.

It will of course be understood that the present invention is not limited to the specific details described herein, which are given by way of example only and that various modifications and alterations are possible within the scope of the appended claims.

The invention claimed is:

1. A method for data communication using spread spectrum techniques and multilevel sequences, comprising:
   linearly adding at least one of binary and nonbinary subsequences that interfere constructively such that synchronous cross-correlation values add constructively to form a plurality of multilevel sequences;
   selecting distinct multilevel sequences from said plurality of mulitlevel sequences; and
   assigning said selected distinct multilevel sequences as symbols for use in a digital communications system.

2. A method as claimed in claim 1 wherein:
   each of said symbols comprises one of said multilevel sequences constructed by adding together at least two of said binary and nonbinary subsequences taken from different sets.

3. A method as claimed in claim 2 wherein said at least one of binary and nonbinary subsequences provided as a binary sequence.

TABLE 13

Structured Codes w = 16

| Preset Set | Addition Table 1 | Addition Table 2 | Addition Table 3 |
|---|---|---|---|
| + + - - + + - - - - + + - - + + | + + - - + - + - + - - + + + + + | + + - - + - - + + + + + - + - | + + - - + + + + + - + - + - - + |
| + - + - + - + - + - + - + - + - | + - + - + - - + + + + + - - - + | + - - + + + - + - + - + - + + + + | + + + + + + - - - + - - + + + - |
| - + + - - + + - + - - + + - - + | + - - + + + + + + + + - + - + - | + + + + + - + - + - + - - - + | + - + - - + - - + + + - - + + + + |
| - - - - - - - - + + + + + + + + | + + + + + + - - + + - + - - + + - - | + - + - + + + + + - - - + + - - | + - - + + - + - + + + + + + - - |
| + + - - - - + + + + - - - - + + | + + - - - + - + - + + - + + + + | + + - - - + + - + + + + + - + | + + - - + + + + + - + - + - + - |
| + - + - - + - + + - + - - + - + | - + - + + + - + + + + + - + + - | - + + - + + - + - + - + + + + | + + + + + + - - - + + - + - - + |
| - + + - + - - + + - - + - + + - | - + + - + + + + + + + - - + - + | + + + + + - + - + + - - - + + - | - + - + - + + - + + + + - - + + + |
| - - - + + + + - - - - + + + + | + + + + - + + - - + - + + + - - | - + - + + + + + - - + + - - | - + + - + - + + + + + + - - - - |
| - - + + + + - - + + - - - - + + | - - + + + - + - - - + + - + + + + | - - + + - + + - + + + + + - + | - - + + + + + + + - + - - - + + |
| - - + + + - - + - + + - - + - + | - + + - + - - - + + + + - + + - | - - + + - - + + + + + + + - + + | + + + + - - + + - - + + - + - |
| - + - + + - + - + - + - - + - + | + - + - - + + + + + - - + + + - | + + + - - - + + + - - + + + + | + - + - - + - - + - - + + + + + |
| + + + + - - - - - + + + + + + + | + + + + - + - + - - + - - - + + | + - + - + + + + - - + + - - + + | - + + - + + - + + + + + - - + + |
| - - + + - - + + - - + + - - + + | - - + + - + + - + + - - - + + + + | - - + + - - + + + + + - + - + | - - + + + + + + + - + - - + + - + |
| - + - + - + - + - + - + - + - + | - + - + - - + + + + + + + - - + | + - - + - - + + - + - + + + + + | + + + + - - + + - - - + - + - + |
| + - - + + - - + + - - + + - - + | + - - + + + + + - - + - + - - + | + + + + - + - + - - - + + - - - | - + - + - - + - - + + + + + + + |
| + + + + + + + + + + + + + + + + | + + + + + - - + - + - + - - + + | - + - + + + + + + - - + - + + | + - - + - + - + + + + + - - + + |

The sets of Structured Codes presented in Table 13 can be used in an MBCK scheme as described in Section 3 with m=4, n=16 and w=16. In this case there are a total of $(2n)^m = 32^4 (=1,048,576)$ multilevel sequences each of length w=16. It is possible to select $8192 (=2^{13})$ unique multilevel sequences which can be used as symbols in an 8192-ary modulation scheme. Since an 8192-ary modulation scheme is capable of encoding k=13 bits per symbol then the bandwidth efficiency of this scheme is k/w=0.8125. The MBCK scheme requires just mn=64 correlators (i.e. 4 banks of 16 correlators) instead of the M/2=4096 correlators required in a conventional 8192-ary bi-code keying scheme.

4. A method as claimed in claim 3 further comprising:
   detecting of said symbols for demodulation using an M-ary receiver.

5. A method as claimed in claim 4 wherein the M-ary receiver incorporates a bank of M correlators in which:
   each M correlator is matched to one of said multilevel sequences; and
   a greatest peak detector of size M is formed to detect the symbols transmitted, wherein M is an integer.

6. A method as claimed in claim 5 wherein each said multilevel symbols is detected using a plurality of banks of predefined length correlators.

7. A method as claimed in claim 6 wherein each predefined length correlator output is subjected to linear addition and analyzed to identify a valid subsequence.

8. A method as claimed in claim 7 further comprising:
utilizing an amplitude demodulation process.

9. A method as claimed in claim 8 wherein the amplitude demodulation process incorporates means for discriminating between different symbols having similar greatest peak positions.

10. A method as claimed in claim 4 wherein at least one of said symbols is detected using m-banks of n-correlators of predefined length, wherein m and n are integers.

11. A method as claimed in claim 10 further comprising:
isolating a correlator output having a greatest peak from the m-banks of n correlators corresponding to the set from which the subsequence was taken.

12. A method as claimed in claim 11 wherein a lookup table is used to decode data bits corresponding to a detected multilevel sequence.

13. A method as claimed in claim 11 wherein the multilevel sequences are constructed by adding together the at least one of binary and nonbinary subsequences taken from complementary sets of binary sequences.

14. A method as claimed in claim 1 further comprising:
identifying subsequences having the properties of being cyclically distinct and possessing:
low autocorrelation sidelobes;
low intra-crosscorrelation magnitudes; and
low inter-crosscorrelation magnitudes.

15. A data communications apparatus using spread spectrum techniques and multilevel sequences, comprising:
means for linearly adding at least one of binary and non-binary subsequences that interfere constructively such that synchronous cross-correlation values add constructively to form a plurality of multilevel sequences;
means for selecting distinct multilevel sequences from said plurality of mulitlevel sequences; and
means for assigning said selected distinct multilevel sequences as symbols for use in a digital communications system.

16. A data communications apparatus as claimed in claim 15 further comprising:
means for detecting of said symbols for demodulation using an M-ary receiver.

17. A data communications apparatus as claimed in claim 16 wherein the M-ary receiver incorporates a bank of M correlators in which:
each M correlator is matched to one of said multilevel sequences; and
a greatest peak detector of size M is formed to detect the symbols transmitted wherein M is an integer.

18. A data communications apparatus as claimed in claim 17 wherein each of said multilevel symbols is detected using a plurality of banks of predefined length correlators.

19. A data communications apparatus as claimed in claim 18 wherein each predefined length correlator output is subjected to linear addition and analyzed to identify a valid subsequence.

20. A data communications apparatus as claimed in claim 19 further comprising:
an amplitude demodulator.

21. A data communications apparatus as claimed in claim 20 wherein the amplitude demodulator includes means for discriminating between different symbols having similar greatest peak positions.

22. A data communications apparatus as claimed in claim 16 wherein the means for detecting said symbols includes m-banks of n-correlators of predefined length wherein m and n are integers.

23. A data communications apparatus as claimed in claim 16, further comprising:
means for isolating a correlator output having a greatest peak from the bank of n correlators corresponding to the set from which the at least one of binary and nonbinary, wherein n in an integer subsequence was taken.

24. A data communications apparatus as claimed in claim 23 further comprising:
a lookup table for decoding data bits corresponding to a detected multilevel sequence.

25. A data communications apparatus as claimed in claim 23 further comprising:
means for adding together the at least one of binary and nonbinary subsequences taken from complementary sets of binary sequences to construct the multilevel sequences.

* * * * *

UNITED STATES PATENT AND TRADEMARK OFFICE
CERTIFICATE OF CORRECTION

PATENT NO. : 7,277,495 B2 Page 1 of 1
APPLICATION NO. : 10/182077
DATED : October 2, 2007
INVENTOR(S) : O'Farrell It is certified that error appears in the above-identified patent and that said Letters Patent is hereby corrected as shown below:

Column 14, Claim 23, correct lines 32 and 33 to read: --nonbinary subsequence was taken, wherein n is an integer.--

Signed and Sealed this

Twenty-fifth Day of December, 2007

JON W. DUDAS
*Director of the United States Patent and Trademark Office*